United States Patent [19]

Steckler et al.

[11] Patent Number: 4,502,078
[45] Date of Patent: Feb. 26, 1985

[54] DIGITAL TELEVISION RECEIVERS

[75] Inventors: Steven A. Steckler, Clark; Alvin R. Balaban, Lebanon, both of N.J.

[73] Assignee: RCA Corporation, New York, N.Y.

[21] Appl. No.: 351,307

[22] Filed: Feb. 22, 1982

[51] Int. Cl.³ .............................................. H04N 5/44
[52] U.S. Cl. .................................................... 358/188
[58] Field of Search ................. 358/13, 21 R, 160, 188

[56] References Cited

U.S. PATENT DOCUMENTS

| 3,946,432 | 3/1976 | Goldberg et al. | 358/13 |
|---|---|---|---|
| 4,031,549 | 6/1977 | Rast et al. | 358/193 |
| 4,218,697 | 8/1980 | Leventer | 358/13 |
| 4,244,027 | 1/1981 | Shai | 364/703 |
| 4,263,611 | 4/1981 | Gibson et al. | 358/23 |
| 4,270,139 | 5/1981 | Flamm et al. | 358/23 |

OTHER PUBLICATIONS

R. Rabiner and Bernard Gold, "Theory and Application of Digital Signal Processing", Prentice-Hall Inc., 1975, pp. 26-28.
C. H. Herrick, "Color Television Theory and Servicing, 2nd Edition" Reston Publishing Co., Inc., 1977, p. 50.
Article "Designer's Guide to: Digital Signal Processing-Part 1" by W. Bucklen, et al., publ. in EDN, Mar. 18, 1981, beginning at p. 133.
Article "Digital VLSI Breeds Next-Generation TV Receivers" by T. Fischer, publ. in Electronics, Aug. 11, 1981, beginning at p. 97.
Booklet "A New Dimension-VLSI Digital TV System" by Intermetall Semiconductors, Sep. 1981.

Primary Examiner—Richard Murray
Attorney, Agent, or Firm—E. M. Whitacre; P. J. Rasmussen; E. P. Herrmann

[57] ABSTRACT

An analog carrier signal and its sidebands contain modulated information which is to be digitally encoded and processed. Demodulation and digital encoding is accomplished in a single process by an analog-to-digital converter, which samples the analog signals in response to a sampling signal of a frequency which is at least twice the bandwidth of the band of frequencies containing the carrier signal and its information-bearing sidebands. The analog signal samples are digitally encoded, producing a band of digital information signals corresponding to baseband signal components. When used in a television receiver to produce digital signal samples, the band of analog signals may include both sound and picture carriers and their audio and video information. By controlling the phase and frequency of the analog carrier signal in relation to the color subcarrier signal, and deriving the sampling signal from the analog carrier, an ease in video signal demodulation is provided.

20 Claims, 7 Drawing Figures

DIGITAL TELEVISION RECEIVERS

This invention relates to digital television receivers in which the baseband television signals are processed by digital signal processing techniques.

Advances in digital circuitry have now made feasible the processing of baseband video signals with digital circuits in a television receiver. Proposed systems envision the use of conventional radio frequency and intermediate frequency circuitry to produce the demodulated baseband video signal and the sound intermediate frequency signal. The baseband video signal is then low-pass filtered by an anti-aliasing filter and converted to digital form by an analog-to-digital (A/D) converter. The anti-aliasing filter band-limits the baseband video signal to prevent overlap of sampled frequencies during the conversion process. The digitized video signal is then processed digitally to produce digital signals representing the red, green and blue color information signals. These signals are then converted to analog form, low-pass filtered and supplied to kinescope drive circuitry. The sound i.f. signal is separated from the analog baseband video signal (if necessary), filtered, and applied to a second A/D converter which digitizes the signal. The digitized sound i.f. signal is then processed and demodulated digitally to produce a pulse-width modulated pulse train, which may then be low-pass filtered to recover the audio signal.

The above-described system is generally referred to as a digital television receiver. However, the entire television signal processing circuitry is not digital, as conventional analog radio frequency and intermediate frequency circuits are used to produce an analog intermediate frequency signal, which is then demodulated to a baseband signal prior to conversion to digital form. Ideally, a digital television receiver should receive the broadcast radio frequency signal and immediately convert it to digital form. But with present technology, such conversion in a television receiver is not yet feasible. The present UHF frequency band in the United States extends beyond 800 MHz. In order to faithfully encode these signals in a digital form, the radio frequency signal must be sampled and encoded at a Nyquist rate which is in excess of 1.6 GHz. This high sampling rate is unfortunately beyond the capability of commercial technology.

A compromise to direct radio frequency signal encoding is to heterodyne the radio frequency signal to a lower frequency signal which can then be directly encoded digitally. In United States television receivers, the radio frequency signal is heterodyned to an intermediate frequency signal band, extending from approximately 41 MHz to 46.5 MHz. However, encoding the intermediate frequency signal would require a Nyquist rate sampling signal of at least 93 MHz, which is also not feasible with today's technology. Hence, proposed digital television systems demodulate the intermediate frequency signals to the baseband frequency range, at which they can be efficiently and economically converted to digital signal samples.

Accordingly, it is desirable to be able to digitally encode a television signal without one or both of the heterodyning steps used to convert the radio frequency television signals to baseband frequencies prior to digital encoding.

In accordance with the principles of the present invention, an analog carrier signal which is modulated with information over a given band of frequencies is sampled and digitally encoded at a rate which does not satisfy the Nyquist criterion for sampling the frequency of the carrier signal, but does meet the Nyquist criterion for sampling the frequency band of the information which is to be recovered from the digitally encoded signals.

In accordance with a particular aspect of the present invention, the analog carrier signal comprises a television intermediate frequency signal in a television receiver. The television intermediate frequency signal is applied directly to an A/D converter for digital encoding, and includes modulated sound and video information. After digitization, the digital sound information is separated from the video information and processed and demodulated digitally. This obviates the need for a separate A/D converter for the sound signal and a separate analog sound i.f. circuit.

In accordance with another aspect of the present invention, the frequency of the i.f. picture carrier is chosen to be a multiple of the color subcarrier frequency. This results in simpler color signal processing, without the need for signal resampling and interpolation.

In accordance with yet another aspect of the present invention, the phase of the i.f. picture carrier is controlled to be aligned in phase with the horizontal synchronizing signal, which affords a further ease in color signal processing.

Figure 1:
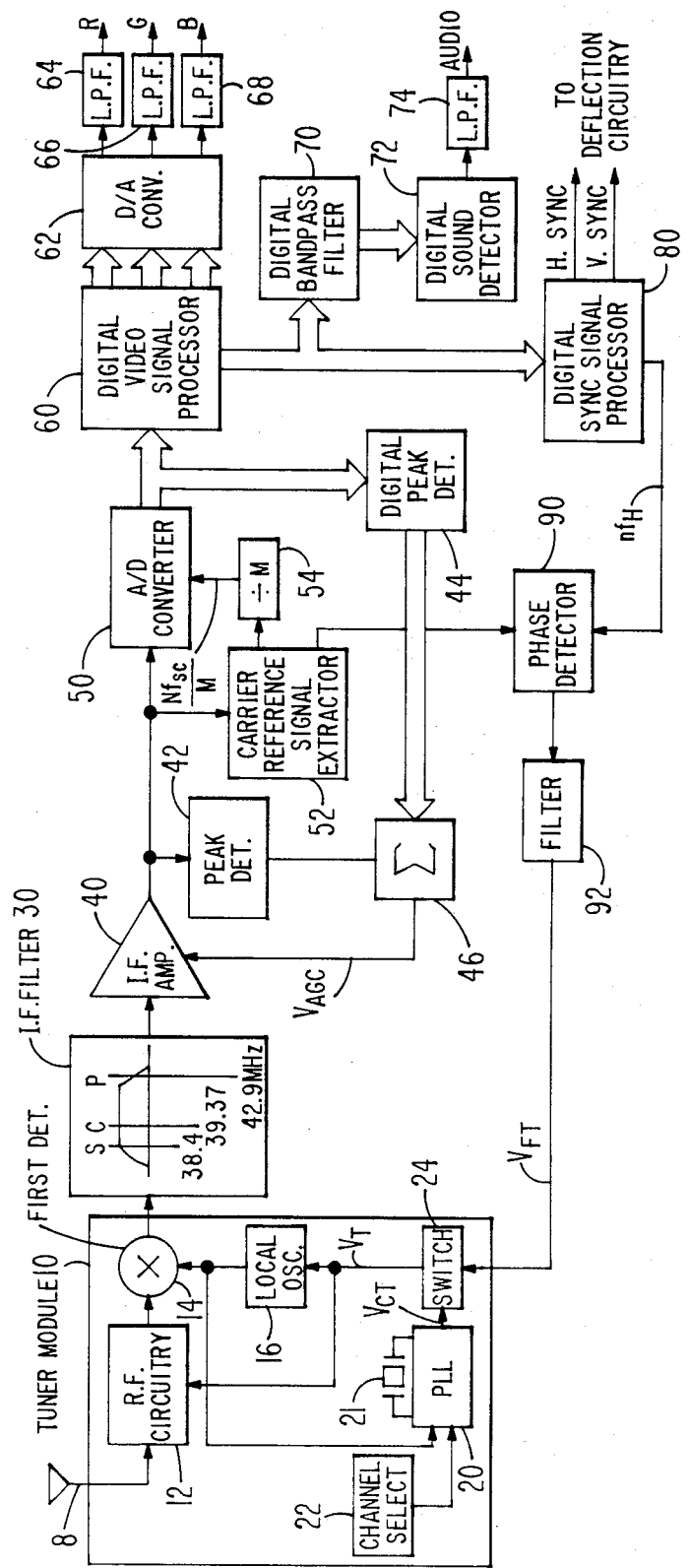
FIG. 1 illustrates, in block diagram form, a digital television receiver constructed in accordance with the principles of the present invention.

Referring to FIG. 1, the signal processing section of a television receiver is shown. Radio frequency (r.f.) signals are received by an antenna 8 and applied to r.f. circuitry 12 of a tuner module 10. The r.f. circuitry 12 includes frequency selective and amplification circuits which provide amplified r.f. signals to one input of a first detector or mixer 14. Channel selection circuits 22 in the tuner module produce digital signals corresponding to the selected channel. The digital signals control a phase-locked loop 20 so as to produce a coarse tuning voltage, $V_{CT}$, for controlling a local oscillator 16 so that its frequency bears a proportional relationship, determined by the channel number, to a reference frequency produced by a crystal oscillator indicated by crystal 21. The $V_{CT}$ voltage is coupled by way of a switch 24 to inputs of the r.f. circuitry 12 and the local oscillator 16. The tuning voltage $V_T$ applied to the r.f. circuitry 12 adjusts the tuning of the frequency selective circuits for the selected television channel, in tracking relationship with the frequency of the local oscillator 16. The local oscillator 16 provides an oscillatory signal for the mixer 14 which heterodynes the r.f. signal of the selected television channel to a specific i.f. frequency band. Once the coarse tuning voltage $V_{CT}$ has tuned the local oscillator for reception of a desired channel signal, reception is maintained by switching the switch 24 so that the local oscillator 16 is controlled by a fine tuning voltage $V_{FT}$. A tuning system of this type is described in greater detail in U.S. Pat. No. 4,031,549.

Figure 2:
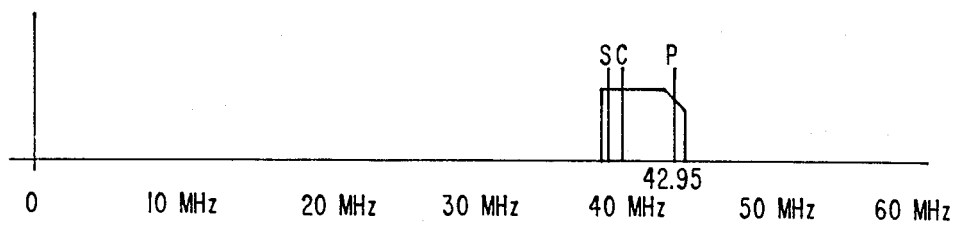
FIG. 2 illustrates the passband of the i.f. filter of FIG. 1.

The signals produced by the mixer 14, now at television intermediate frequencies, are applied to an i.f. filter 30. The i.f. filter 30 shapes the response characteristic for the i.f. signals of the selected television channel. The response characteristic at the output of the i.f. filter 30 is shown in FIG. 2. Signals above and below the limits of the i.f. passband are attenuated by the i.f. filter.

The i.f. signals passed by the i.f. filter are applied to an i.f. amplifier 40, which amplifies (or attenuates) the i.f. signals in response to a gain control voltage $V_{AGC}$. The amplified i.f. signals are then applied to an A/D converter 50 for digitization. The i.f. signals are sampled by the A/D converter 50 in response to a sampling signal $Nf_{sc}/M$. Digitized video signals of, for example, eight bits, are produced by the A/D converter 50. The digital signals include both video and sound information.

The digital signal is applied to a digital video signal processor 60, which separates and processes the video picture information and produces digital red, green and blue color signals. A digital video signal processor suitable for use as processor 60 is shown and described in U.S. Pat. No. 4,415,918, filed Aug. 31, 1981, and entitled DIGITAL COLOR TELEVISION SIGNAL DEMODULATOR. These signals are applied to a digital-to-analog (D/A) converter 62, which converts the signals to analog form. The analog signals produced by the D/A converter 62 are applied to low pass filters 64, 66 and 68, which removes unwanted higher frequency components of the analog signals to produce R, G and B color signals for display on a kinescope.

Digital signals containing sound and synchronizing signal information are coupled from the digital video signal processor to inputs of a digital bandpass filter 70 and a digital sync signal processor 80. The digital bandpass filter 70 passes digital sound information in the vicinity of the sound carrier to a digital sound detector 72. The digital sound detector detects the audio information and produces, for example, a pulse-width modulated signal representing audio information. This signal is filtered by a lowpass filter 74 to recover the audio information for subsequent reproduction.

The digital sync signal processor 80 extracts and separates the horizontal and vertical sync signals and produces horizontal and vertical rate pulse trains for deflection circuitry (not shown) in the television receiver. The digital sync signal processor also produces a signal which is a multiple, n, of the horizontal sync signal frequency $f_H$, and is substantially in a constant phase relationship with the horizontal synchronizing signal. This signal, $nf_H$, is applied to one input of a phase detector 90, which also receives a signal representative of the extracted picture carrier signal from the carrier reference signal extractor 52. The phase detector 90 compares the phase of these two signals, and generates a control signal which is filtered by a filter 92 and applied to the switch 24 in the tuner module as fine tuning voltage $V_{FT}$. The fine tuning voltage $V_{FT}$ controls the local oscillator 16 so as to maintain the i.f. picture carrier in a substantially constant phase relationship with the horizontal synchronizing signal.

In accordance with the principles of the present invention, the A/D converter 50 converts the information of the modulated i.f. signals directly into digital signal samples suitable for baseband signal processing without the need for a second (video) detector. A carrier reference signal extractor circuit 52 has an input coupled to receive the i.f. signal and produces a signal which is aligned in frequency and in a substantially constant phase relationship with the picture carrier. Preferably, the signal produced by the extractor circuit 52 has a phase which is in a ninety degree lagging phase relationship relative to the picture carrier signal. The extracted signal is divided in frequency by a divide-by-M circuit 54 to produce a sampling signal for the A/D converter 50. The carrier reference signal extractor 52 may comprise, by way of example, a frequency selective circuit tuned to the i.f. picture carrier frequency and a ninety degree phase shifter, or a phase-locked loop circuit and a ninety degree phase shifter which produces an oscillatory signal at the i.f. picture carrier frequency and in a quadrature phase relationship therewith. The oscillatory signal is then divided down to the desired sampling frequency. The A/D converter 50 samples the analog i.f. signal in response to the sampling signal, and converts the samples to digital words at the sampling signal rate.

The A/D converter 50 should sample the analog signal at a rate which meets the Nyquist criterion for the bandwidth of the information which is to be recovered. If the Nyquist criterion is not met, the frequency spectrum of the signal samples will contain bands of frequencies which overlap (alias) each other. These aliasing components can be substantially different from the original components at the same frequencies. Once aliasing occurs, attempts to recover the desired information from the samples result in distortion caused by the overlapping parts of the spectrum. Such distortion cannot be removed by filtering the recovered signal.

One common technique of preventing aliasing is to limit the bandwidth of the analog signal applied to the input of the A/D converter with a low pass anti-aliasing filter. The sampling rate for the A/D converter is then chosen to be at least twice the cutoff frequency of the anti-aliasing filter.

In the arrangement of FIG. 1, a separate anti-aliasing filter is not necessary. Instead, the bandlimiting nature of the i.f. filter 30 is relied upon to prevent aliasing. The television signal information which is to be recovered conventionally lies between 40.75 MHz and 46.5 MHz, with the picture carrier frequency located at 45.75 MHz. The video signal is a double sideband signal in the vicinity of the picture carrier (±0.75 MHz), which is located on the vestigial slope of the i.f. passband characteristic. Thus, all of the video information is contained in single sideband form between 40.75 MHz and 45.75 MHz in an i.f. band of 5.0 MHz, which also includes the sound carrier. With a bandwidth of 5.0 MHz, the sampling signal frequency must be at least 10.0 MHz to meet the Nyquist criterion. As another example, consider the i.f. passband characteristic of i.f. filter 30 of FIG. 1, which extends from approximately 37.95 MHz to 43.7 MHz, with the picture carrier located at 42.95 MHz. This i.f. response characteristic is also shown in FIG. 2. When the i.f. picture carrier frequency of 42.95 MHz of FIG. 2 is extracted by the carrier frequency signal extractor 52 and divided by four by the divide-by-M circuit 54, a sampling signal of 10.7375 MHz results. When signals of this i.f. passband are encoded by a 10.7375 MHz sampling signal, an idealized spectrum of frequencies, shown in FIG. 3, results. As a result of the encoding process the original passband is replicated and shifted to new frequency locations distributed around frequencies which are multiples of the sampling signal frequency. One replica of the original passband 100 which also results from a harmonic component of the sampling signal is shown as passband 102, extending from zero to 5 MHz. The passband 102 is shown in an enlarged view in FIG. 4, and is seen to contain the color subcarrier frequency at 3.58 MHz and the sound carrier at 4.5 MHz. The next higher band of frequencies begins at approximately 5.74 MHz, and is separated from the lower band of frequencies by approximately 740 KHz. Thus, it is seen that ther is no overlap of the replicated passbands, and therefore no aliasing.

Figure 3:
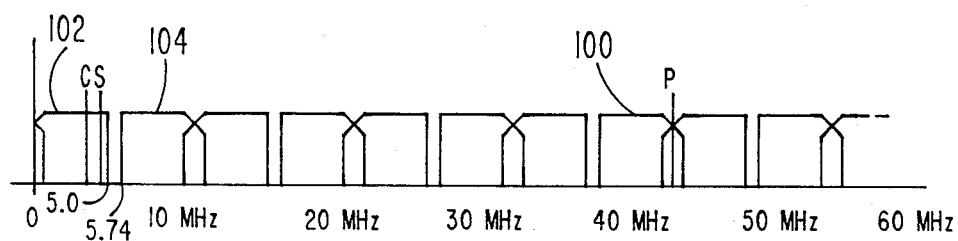
FIG. 3 illustrates the frequency spectrum of signals produced by the A/D converter of FIG. 1.
Figure 4:
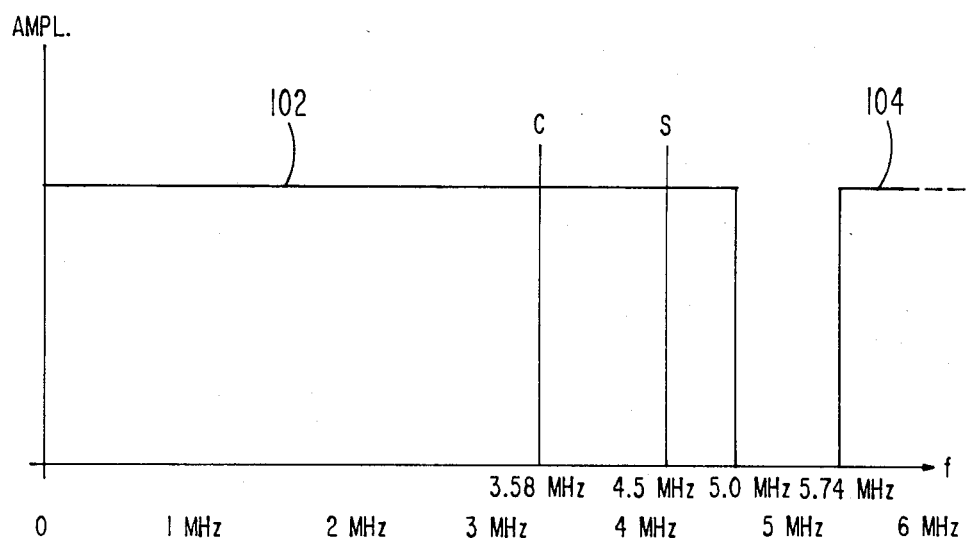
FIG. 4 illustrates a portion of the frequency spectrum of FIG. 3.

In FIG. 3, it is seen that there are apparent overlaps of the replicated passbands around the multiples of the sampling frequencies, 10.74 MHz, 21.48 MHz, 32.22 MHz, 42.95 MHz, etc. These overlapping areas do not constitute aliasing, however, but are an overlap of the double sideband modulated regions of the video information. Since the overlapping is centered around the picture carrier frequency, the double sideband components on respective sides of the picture carrier frequency effectively are combined and reinforce each other. The double sideband portion of each passband is reconstituted digitally in this overlapping manner.

It must be noted that the sampling signal rate of 10.74 MHz does not satisfy the Nyquist criterion for the i.f. signal frequencies of 37.95 MHz to 43.7 MHz. This is permissible in accordance with the principles of the present invention because it is not the i.f. frequencies which are to be recovered digitally, but the information represented by modulation of those signals, which is contained within a 5.0 MHz band. The 10.74 MHz sampling rate is seen to satisfy the Nyquist criterion for sampling and recovering information contained within a passband of 5.0 MHz. By eliminating signal components below 37.95 MHz in the i.f. filter, aliasing of signals is prevented during the encoding process.

Signal components of the upper frequency passbands above the baseband range (0–5 MHz) in FIG. 3 are contained in the digitally encoded signal samples, but do not adversely affect the processing of the signals. These higher frequency components are attenuated by the response characteristic of the D/A converter 62, and are further attenuated by the lowpass filters 64, 66, 68 coupled to the outputs of the D/A converter 62, and by the lowpas filter 74 associated with the digital sound detector 72.

Because the conversion process which samples and encodes the television i.f. signal is essentially a linear process of frequency translation, the passband which is encoded can contain the sound carrier. Other frequency translation circuits, such as a diode detector, are nonlinear, and can create undesired intermodulation products of the sound carrier and picture subcarrier frequencies. The linear nature of the A/D conversion process thus permits the sound information to be simultaneously encoded by the A/D converter 50. Thus, the entire television signal is digitally encoded by the A/D converter 50.

The conversion technique of the present invention, which directly encodes the television i.f. signal information into digital signal samples representing baseband video information, is applicable for any picture carrier frequency, and for any sampling frequency which satisfies the Nyquist criterion for the bandwidth of the television information. For example, in the United States, the conventional NTSC i.f. picture carrier frequency is 45.75 MHz. When the divide-by-M circuit 54 divides the extracted carrier frequency by four (M=4), the sampling signal frequency for the A/D converter 50 is 11.4375 MHz. This sampling frequency satisfies the Nyquist criterion for encoding both the sound and picture information, which together have a bandwidth of approximately 5 MHz and thus require a sampling signal frequency of at least 10 MHz. It also satisfies the Nyquist criterion for encoding only the video information of the television signal, which has a bandwidth of approximately 4.2 MHz.

However, when the i.f. signal is sampled at a frequency of 11.4375 MHz, the color signal component will be sampled at different phases with respect to the phase of the color burst signal from one burst period of the color signal to another. That is, the color signal will be sampled every 112.66° with respect to a period of the burst signal. If one burst period of the color signal is sampled at 0°, 112.66°, 225.3° and 338° with respect to the burst phase, the next period of the color signal will be sampled at 90.6°, 203° and 316° with respect to the burst phase. This changing demodulation angle of the color signal requires that interpolations be done on the separated color signal samples to produce samples at the phases of the desired color mixture signals (e.g., I and Q or (R-Y) and (B-Y)) before the color signals are demodulated and matrixed to produce R, B and G color signals.

In accordance with the principles of a further aspect of the present invention, the television i.f. picture carrier frequency in the embodiment of FIG. 1 is chosen to be a multiple of the color burst signal frequency. This permits demodulation of the color signal components of the video signal through subsampling, (i.e., selecting certain samples at a lower rate than the sampling signal of the A/D converter) without the need for complex interpolation. The complexity of the digital video signal processor is reduced accordingly.

In the arrangement of FIG. 1, the frequency of the local oscillator is chosen so that the r.f. picture carrier is translated to an i.f. frequency of 42.95454 MHz, which is twelve times the subcarrier frequency of the color burst signal. The i.f. frequency of the color subcarrier is accordingly 39.374995 MHz, and the sound carrier is shifted to 38.45454 MHz. An i.f. picture carrier of 42.95454 MHz, amplitude-modulated by one cycle of the color burst signal, is shown in FIG. 5b, in which the picture carrier signal 108 leads the idealized burst signal envelope 110 in phase by 90° of the picture carrier so that peaks of the picture carrier occur at the zero degree points of the burst signal envelope. For ease of illustration, the depth of modulation of the i.f. picture carrier 108 has been increased beyond that which it normally exhibits and the effects of the sound carrier have been deleted.

Figure 5A:
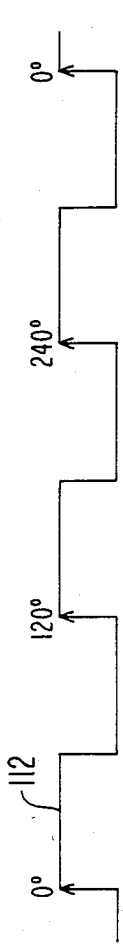
FIG. 5 illustrates waveforms depicting the operation of the A/D converter of FIG. 1.
Figure 5B:
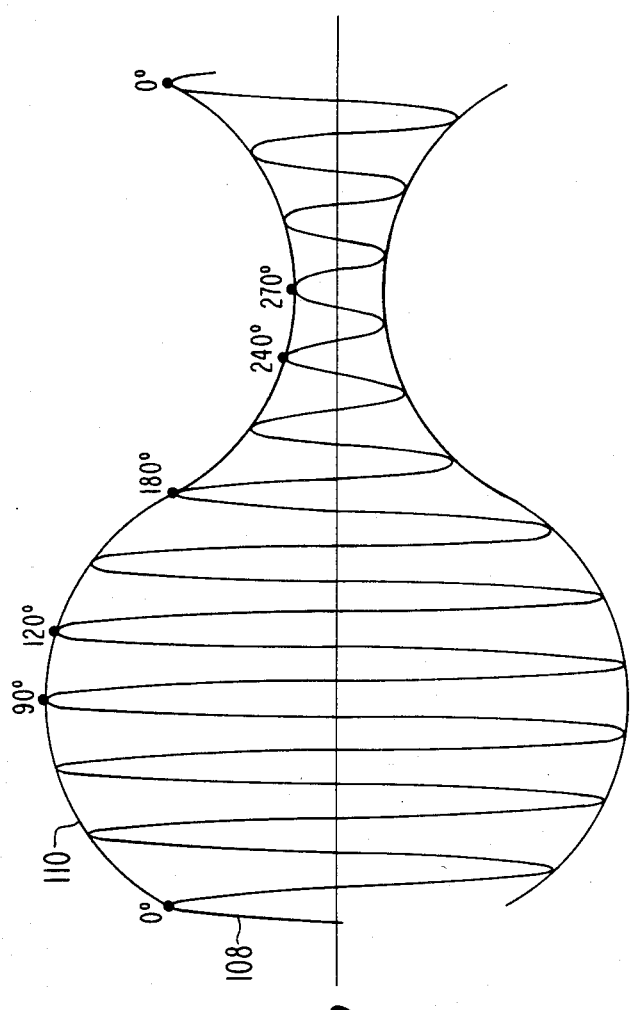

When the picture carrier of FIG. 5b is extracted from the i.f. signal by the extractor 52 and divided by four (M=4), a sampling signal of 10.74 MHz results, as shown by sampling signal waveform 112 of FIG. 5a. This sampling signal is of the form $Nf_{sc}/M$, where $f_{sc}$ is the color subcarrier frequency of 3.579545 MHz, N is 12, and M is 4 is this example. Sampling signal 112 will sample the i.f. signal at the picture carrier peaks occurring at 0°, 120° and 240° with respect to the color burst signal by sampling at the times of the positive transitions of sampling signal 112. However, by virtue of the odd multiple relationship between one-half the horizontal line rate and the color subcarrier frequency in the NTSC system, the burst signal at the same point in time in the succeeding line as the one shown in FIG. 5b will be sampled at 60°, 180° and 300°. This effective interleaving of samples in the vertical direction increases the complexity of comb filtering which may be used to separate the luminance and chrominance signals in the digital video signal processor 60. Alignment of the samples in the vertical direction will alleviate this problem, and can be achieved by reversing the phase of sampling signal 112 from one horizontal line to another by, for instance, a switch which is responsive to the horizontal synchronizing signal, as shown in U.S. Pat. No. 3,946,432.

Color demodulation of the separated color signal samples, when produced by the 10.74 MHz sampling signal of FIG. 5a, is relatively straightforward. The sample at 0° of the color subcarrier is aligned with the -(R-Y) color mixture signal axis, and this color mixture signal may be recovered by subsampling. The -(B-Y) signal color mixture signal axis at 90° is three-fourths of the way between the first and second samples at 0° and 120°, and may be recovered by a simple interpolation of the values of the two samples.

Figure 5C:
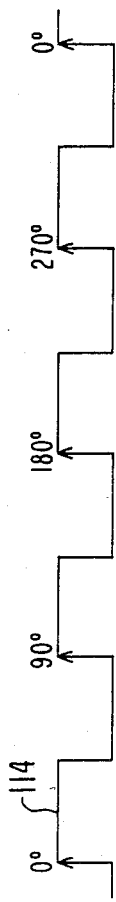

Even this simple interpolation may be eliminated if the system designer is willing to accept the higher data rate of a four times subcarrier sampling system. In that case, the divide-by-M circuit 54 is adjusted to divide the extracted subcarrier signal by three, causing $Nf_{sc}/M$ to be equal to $4f_{sc}$, or approximately 14.32 MHz. When the carrier signal 108 of FIG. 5b is divided by three, a sampling signal as represented by waveform 114 of FIG. 5c results. The positive-going transitions of FIG. 5c will sample the i.f. signal of FIG. 5b at 0°, 90°, 180° and 270° with respect to the color burst signal envelope 110. Samples at these phase angles may be directly combined in a comb filter to separate the luminance and chrominance signals, and correspond directly to the axes of the -(R-Y), -(B-Y), (R-Y), and (B-Y) color mixture signals. Thus, the chrominance signal resulting from comb filtering may be demodulated directly by subsampling, without the need for interpolation.

Other i.f. picture carrier frequencies which are multiples of the color subcarrier frequency may also be desirable in a particular receiver design. For instance, if the i.f. picture carrier frequency is sixteen times the color subcarrier frequency, or 57.27272 MHz, the divide-by-M circuit 54 may be adjusted to divide the extracted picture carrier by four, resulting in the favorable sampling signal frequency of 14.32 MHz, or four times the color subcarrier frequency. The 57.27272 MHz i.f. picture carrier signal frequency may be desirable in a Japanese NTSC receiver, since the conventional i.f. picture carrier frequency in Japan is 58.75 MHz and the color subcarrier frequency is 3.579545 MHz.

In order to maintain the desired phase alignment of the video signal and the i.f. picture carrier as shown in FIG. 5b, it is necessary to control the phase of the i.f. picture carrier. This is accomplished in the embodiment of FIG. 1 by a phase detector 90 and a filter 92. The phase detector 90 compares the phase relationship of a signal representative of the extracted i.f. picture carrier produced by the carrier reference signal extractor 52 and a signal $nf_H$, which is a multiple of the horizontal synchronizing signal frequency. For example, the extracted picture carrier signal may be divided down in frequency by a frequency divider to the $nf_H$ frequency. If desired, some or all of the frequency division may be provided by the divide-by-M circuit, if appropriate. The $nf_H$ signal may be produced by first detecting the horizontal synchronizing signal, either in the digital sync signal processor 80 or external to the digital signal processing section of the receiver. A digital deflection system, identified as the MAA 2500 Digital Deflection Control Unit shown in the pamphlet "A New Dimension—VLSI Digital TV System" by Intermall Semiconductors (Sept. 1981) shows an arrangement which produces a horizontal rate $f_H$ signal, from a digitized composite video signal.

Alternatively, a conventional peak detector, similar to peak detector 42, and a sync separator may be used to peak detect and separate the horizontal synchronizing signal components $f_H$ of the analog i.f. signal. The horizontal rate $f_H$ signal is then applied to a digital frequency multiplier such as that shown in U.S. Pat. No. 4,244,027 to develop the $nf_H$ signal. The phases of the two input signals to the phase detector 90, now both at the same frequency, may then be directly compared. A signal representative of this comparison is filtered by filter 92 to produce a control voltage $V_{FT}$, which is used to fine tune the local oscillator 16 to maintain the i.f. picture carrier frequency at 42.95454 MHz. The phase detector and filter circuit 90,92 is effective to control the phase of the 42.95454 MHz picture carrier because the $nf_H$ phase comparison signal is a multiple of the i.f. picture carrier frequency. In the NTSC color television system, the horizontal scanning frequency $f_H$ is equal to 15,734.26 Hz. In addition, since the horizontal sync signal is precisely related in phase to the color subcarrier signal by the broadcaster in accordance with FCC requirements, the comparison of the i.f. picture carrier representative signal and the $nf_H$ signal produces a phase indication signal which, in the form of the $V_{FT}$ control voltage, maintains the local oscillator signal at a frequency and phase necessary to maintain the desired relationship between the i.f. picture carrier and the modulated color information. The i.f. picture carrier phase control provided by the AFPC loop prevents any noticeable variation in the tint of the reproduced television image, for instance.

Since the television i.f. signal is being applied directly to the input of the A/D converter 50, it is necessary to maintain the i.f. signal excursions within the dynamic range of the input to the A/D converter. When an eight-bit A/D converter is used for A/D converter 50, for instance, the analog signal will be converted into one of 256 digital signal levels. The i.f. signal level must be controlled so that the digitized signal does not exceed the value of the 256th or highest level. A peak detector 42 monitors the peaks of the i.f. signal applied to the input of the A/D converter 50, and a digital peak detector 44 monitors the peak values of the digital signal samples. The results of the two peak detections are combined in a summing network 46, which produces a gain control voltage $V_{AGC}$, which is applied to the i.f. amplifier 40. The $V_{AGC}$ control voltage automatically maintains the i.f. signal level within the dynamic range requirements of the A/D converter 50. Details of the construction and operation of this AGC circuit may be found in our concurrently filed U.S. Pat. No. 4,434,439, entitled "Digital Television AGC Arrangement".

It may be appreciated that the r.f. signal produced in the tuner module 10 may be encoded directly into digital information in accordance with the principles of the present invention, in the same way as the i.f. signal is encoded in the embodiment of FIG. 1. In such an application of the principles of the present invention, the r.f. picture carrier would be extracted and divided down in frequency to produce a sampling signal of a frequency which meets the Nyquist criterion for the television channel band which is to be encoded. The r.f. frequency selective circuitry must provide sufficient rejection of all but the selected channel signals to prevent aliasing in the digitized information. Such an arrangement would eliminate the first detector, the i.f. filter, and the i.f. amplifier. However, phase control of the analog picture carrier is also eliminated by the elimination of the mixer, which could increase the complexity of the color signal demodulation process by requiring interpolation of the baseband signal samples. Also, a wide range of gain control, previously provided in the i.f. amplifier, would now be required in the r.f. circuitry.

What is claimed is:

1. In a signal processing system, including a source of radio frequency signals modulated with analog signal information and occupying a given band of frequencies, apparatus comprising:
   means, for producing a sampling signal having a frequency which is less than twice the highest frequency of said radio frequency signals;
   an analog to digital converter having a signal input coupled to receive said modulated radio frequency signals, a sampling signal input coupled to receive said sampling signal, and an output, for sampling said radio frequency signals at said sampling signal frequency and converting the samples so obtained to digital signals representing said analog signal information contained within a band of frequencies which is less than said given band of frequencies of said radio frequency signals; and
   digital signal processing means responsive to said digital signal samples for producing processed digital information signals.

2. The arrangement of claim 1, wherein said source of radio frequency signals provides signals occupying a television intermediate frequency passband, and wherein said sampling signal frequency is at least twice the frequency difference between the lowest frequency and the highest frequency of said passband.

3. The arrangement of claims 1 or 2 wherein said source of radio frequency signals produces a carrier signal of a given frequency located within said given band of frequencies, and wherein said sampling signal exhibits a frequency which is a submultiple of said carrier signal frequency.

4. In an information signal processing system, including a source of intermediate frequency signals modulated with analog information, apparatus comprising:
   intermediate frequency signal processing circuitry, having an input coupled to receive said intermediate frequency signals, and including an i.f. filter for shaping an i.f. signal passband, and an output at which signals containing said analog information and occupying said i.f. signal passband are produced;
   means for producing a sampling signal having a frequency which is at least twice the bandwidth of said i.f. signal passband and is lower than the frequencies of said i.f. signals occupying said i.f. signal passband;
   an analog to digital converter, having an input coupled to the output of said intermediate frequency signal processing circuitry, for sampling the signals contained within said i.f. signal passband in response to said sampling signal and converting the signal samples to digital signal samples representing said analog information contained within a band of frequencies which is lower than said i.f. passband; and
   digital signal processing circuitry having an input coupled to said analog to digital converter, and responsive to said digital signal samples for producing processed digital information signals.

5. In a television receiver, including a source of intermediate frequency signals modulated with television information and contained within a television intermediate frequency passband, and a digital television signal processor for processing digital television signal samples contained within a baseband frequency range which is below said intermediate frequency passband; signal translation apparatus comprising:
   a source of sampling signals having a frequency which is less than twice the highest frequency of said intermediate frequency passband; and
   an analog to digital converter having an input coupled to receive said television intermediate frequency signals, and responsive to said sampling signals for converting said television intermediate frequency signals to digital television signal samples representing said television information and contained within said baseband frequency range.

6. The arrangement of claim 5, wherein said intermediate frequency signals include an intermediate frequency picture carrier; and wherein said source of sampling signals comprises:
   a carrier reference signal extraction circuit having an input coupled to receive said intermediate frequency signals and an output at which a reference signal with a frequency substantially equal to the frequency of said intermediate frequency picture carrier is produced; and
   a divider circuit having an input coupled to receive said reference signal and an output at which a sampling signal is produced having a frequency which is a submultiple of said reference signal frequency.

7. In a television signal processing system, including a source of analog television signals having an output, said signals being modulated by television video and sound information; and digital television signal processing circuitry including digital video signal processing circuitry and digital sound signal processing circuitry; apparatus comprising:
   a digital to analog converter having an input coupled to the output of said source of modulated analog television signals and an output coupled to said digital video signal processing circuitry and said digital sound signal processing circuitry at which digital signal samples representing said video and said sound information are provided.

8. In a television receiver, including a source of radio frequency signals modulated with television information and occupying a band of frequencies including a color subcarrier frequency and a picture carrier frequency apparatus comprising:
   means for converting said radio frequency signals to signals contained within a band of television intermediate frequencies including an intermediate frequency picture carrier frequency which is an integer multiple of the difference between said color subcarrier frequency and said picture carrier frequency;
   an analog to digital converter, having an input coupled to receive said television intermediate frequency signals and an output for producing digital television signal samples representing said television information; and digital signal processing circuitry having an input coupled to the output of said analog to digital converter for processing said digital television signal samples.

9. In a television signal processing system, including a source of radio frequency signals including an r.f. picture carrier modulated with television signals including horizontal synchronizing signal components; apparatus comprising:

means, responsive to a control signal, for converting said radio frequency television signals to intermediate frequency signals, including an i.f. picture carrier modulated with said television signals;

means, responsive to said intermediate frequency signals, for producing a reference signal having a frequency which is a multiple of the frequency of said horizontal synchronizing signal components; and a phase detector having a first input coupled to receive a signal representative of said i.f. picture carrier, a second input coupled to receive said reference signal, and an output at which said control signal is produced.

10. In a television signal processing system, including a source of analog television information intermediate frequency signals including an i.f. picture carrier of a given frequency, signal translation apparatus comprising:

intermediate frequency signal processing circuitry, having an input coupled to received said analog television intermediate frequency signals, and including an intermediate frequency filter for shaping an i.f. signal passband of frequencies including said i.f. picture carrier signal, an intermediate frequency amplifier, and an output at which intermediate frequency signals contained within said i.f. signal passband are produced;

means, responsive to said intermediate frequency signals, for producing a sampling signal which is less than twice the frequency of said i.f. picture carrier;

an analog to digital converter, having an input coupled to the output of said intermediate frequency signal processing circuitry, and responsive to said sampling signal for sampling said intermediate frequency signals contained within said i.f. signal passband to produce digital signal samples representing said television information and contained within a band of frequencies which is lower in frequency than said i.f. signal passband frequencies; and digital signal processing means, responsive to said digital signal samples, for producing processed digital television signals.

11. The arrangement of claim 10, wherein said analog to digital converter further includes a sampling signal input, and wherein said sampling signal means further comprising:

sampling signal generating means, having an input coupled to said intermediate frequency signal processing circuitry for receiving said i.f. picture carrier signal, and an output coupled to said sampling signal input of said analog to digital converter, for producing a sampling signal of a frequency which is a submultiple of said given frequency;

wherein said analog to digital converter produces said digital signal samples at a rate determined by the frequency of said sampling signal.

12. The arrangement of claim 11, wherein said sampling signal generating means comprising a carrier reference signal extractor circuit responsive to said i.f. picture carrier for producing a reference signal substantially at the frequency of said given frequency; and a frequency divider responsive to said reference signal for producing said sampling signal.

13. The arrangement of claim 12, wherein said carrier reference signal extractor circuit includes a tuned circuit tuned to said given frequency.

14. The arrangement of claim 12, wherein said carrier reference signal extractor circuit includes a phase-locked loop circuit.

15. In a television receiver, apparatus for processing television signal information contained within a radio frequency band of signals comprising:

radio frequency converting means, responsive to said radio frequency signals, for converting said radio frequency band of signals to a given lower band of intermediate frequency signals;

intermediate frequency converting means, responsive to said intermediate frequency band of signals, for converting said intermediate frequency signals to signals contained within a given lower band of baseband signals; and means for processing said baseband signals;

wherein said intermediate frequency converting means comprises an analog to digital converter.

16. In a television receiver, including a source of analog video information signals contained within a band of frequencies including a picture carrier of a given frequency, signal translation apparatus comprising:

sampling signal producing means, coupled to said source of signals, for producing a sampling signal of a frequency which is a submultiple of said given frequency; and an analog to digital converter, having an input coupled to receive said band of signals from said source, for sampling said signals in response to said sampling signal and converting said sampled signals to digital signal samples representing said video information and contained within a band of frequencies which is lower than said given frequency.

17. In a television receiver, including a source of modulated video and sound information signals contained within a band of frequencies including a video carrier and a sound carrier, apparatus comprising:

an analog to digital converter having an input coupled to said signal source for producing digital signal samples representing said video and sound information;

a digital video signal processor, responsive to said digital signal samples, for producing processed digital video signals;

a digital bandpass filter, responsive to said digital signal samples, and having an output for passing digital signal samples containing said sound information to the exclusion of said video information; and a digital sound signal processor, coupled to the output of said digital bandpass filter, for producing a processed sound signal.

18. In a television receiver, including a source of radio frequency television signals including an r.f. picture carrier modulated with video information signals including horizontal scanning rate signal components of a given frequency, said signals being contained within a band of frequencies including the frequency of said r.f. picture carrier; apparatus comprising:
   means for converting said radio frequency television signals to intermediate frequency television signals, including an i.f. picture carrier at a frequency which is an integer multiple of said given frequency; and
   means for processing said intermediate frequency television signals to produce processed video signals and said horizontal scanning rate signal components of said given frequency.

19. The arrangement of claim 18, wherein said converting means further includes a conversion control signal input; and further comprising:
   phase comparison means, having a first input coupled to receive said i.f. picture carrier, a second input coupled to said processing means for receiving a signal of a frequency which is an integer multiple of said horizontal scanning rate signal components, and an output coupled to said conversion control signal input at which a control signal is produced.

20. In a television receiver, including a source of analog intermediate frequency television signals including an i.f. picture carrier, apparatus for producing digital television signal samples for a digital video signal processor comprising:
   an anti-aliasing filter having an input coupled to said source of analog intermediate frequency television signals and an output for defining a band of television information signals which are to be sampled;
   an analog to digital converter, having an input coupled to the output of said anti-aliasing filter and an output, for sampling television information signals passed by said filter and producing digitally encoded television information samples; and
   a digital video signal processor having an input coupled to the output of said analog to digital converter;
   wherein said anti-aliasing filter comprises an i.f. passband shaping filter which defines a passband of i.f. frequencies including said i.f. picture carrier.

* * * * *